United States Patent [19]

Gutshall

[11] 4,309,135
[45] Jan. 5, 1982

[54] CONCRETE ANCHOR

[75] Inventor: Charles E. Gutshall, Rockford, Ill.

[73] Assignee: Keystone Consolidated Industries, Inc., Peoria, Ill.

[21] Appl. No.: 169,979

[22] Filed: Jul. 18, 1980

[51] Int. Cl.³ .............................................. F16B 13/00
[52] U.S. Cl. ..................................... 411/17; 411/262
[58] Field of Search ............... 411/17, 16, 18, 262, 411/438; 267/167, 166, 179

[56] References Cited

U.S. PATENT DOCUMENTS

| | | | |
|---|---|---|---|
| 977,709 | 12/1910 | Craig | 411/17 X |
| 1,199,624 | 9/1916 | Smith, Jr. | 411/17 |
| 2,649,830 | 8/1953 | Arnold | 411/16 |
| 3,945,070 | 3/1976 | Hauser | 411/438 X |
| 3,983,736 | 10/1976 | King, Jr. | 411/17 X |

FOREIGN PATENT DOCUMENTS 152336 10/1920 United Kingdom ................ 411/438

Primary Examiner—Ramon S. Britts
Attorney, Agent, or Firm—Merriam, Marshall & Bicknell

[57] ABSTRACT

An improved concrete anchor consists of an expansion nut in the form of a cylindrical coil of a resilient material and a bolt provided with a thread adapted to receive the coil. The thread of the bolt has two sections of different effective minor diameters. A first section immediately adjacent the threaded end of the bolt has a minor diameter sufficiently small to permit the bolt to enter the coil without causing any distortion or enlargement in the outer diameter of the coil. Adjacent the first threaded section and extending toward the head of the bolt is a second section having a larger minor diameter which causes expansion of the coil on engagement therewith. The end of the coil facing away from the head of the bolt is provided with a short, straight tab portion which extends in a direction generally away from the head of the bolt while tapering inwardly toward the axis thereof. The opposite end of the coil is provided with locking means for engaging the wall of the hole in which the anchor assembly is used in order to inhibit rotation of the coil.

12 Claims, 8 Drawing Figures

U.S. Patent  Jan. 5, 1982  Sheet 1 of 2  4,309,135
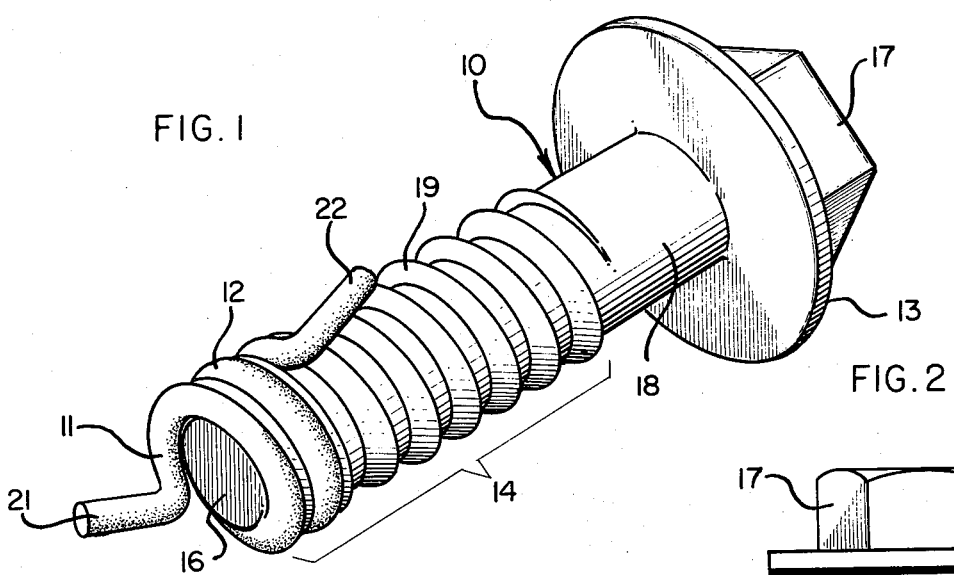
FIG. 1
FIG. 2
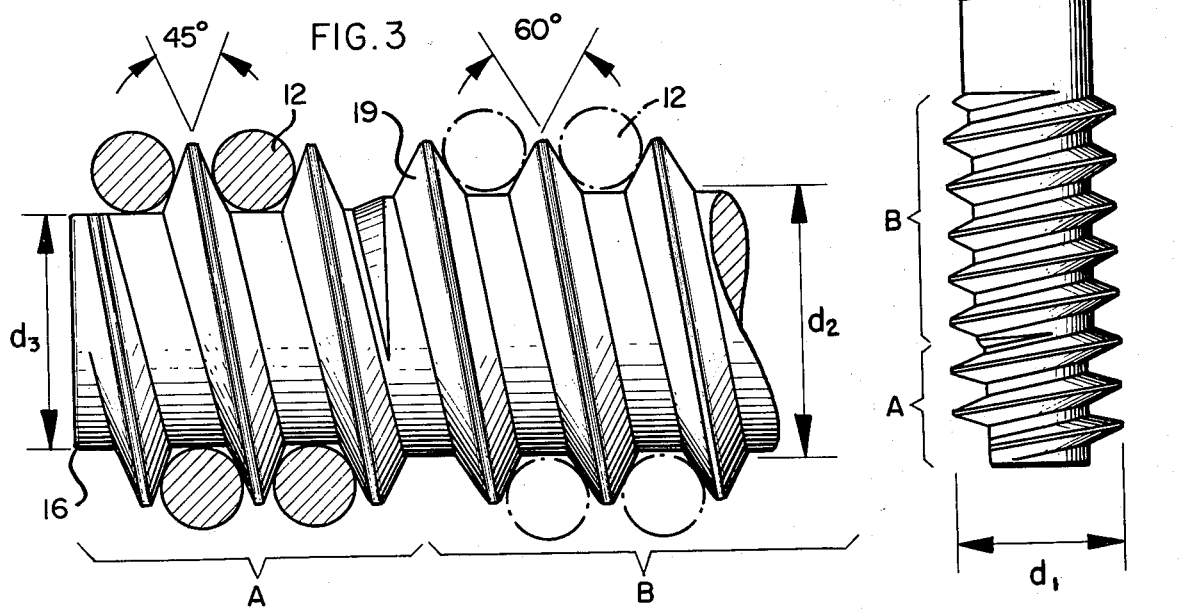
FIG. 3
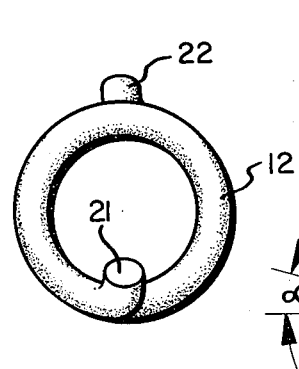
FIG. 5
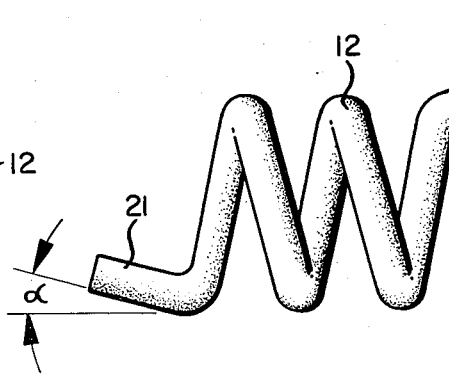
FIG. 4
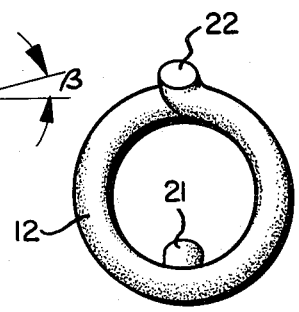
FIG. 6

4,309,135

CONCRETE ANCHOR

This invention relates to concrete anchors and more particularly to an improved concrete anchor having increased holding power and means for indicating an adequately tightened condition, thereby preventing failure of the anchor through over-tightening.

BACKGROUND OF THE INVENTION

Fastening or anchoring devices for use in concrete, cement, and similar materials, comprising a helical coil which is expanded into contact with the walls of a hole in the material by the wedging action of a threaded member such as a bolt or screw are well known. Illustrative of such devices are those shown in U.S. Pat. Nos. 806,406, 906,691, 1,199,624, and 3,967,525. In general, such anchors incorporate a helical coil insert which rides on the threads of a threaded member. When driven into a hole of appropriate size, the coil is prevented from rotating by contact with the walls of the hole. Rotation of the bolt expands the coil into locking contact with the walls of the hole, thus providing the desired attachment.

While devices of this type are generally effective for their intended purpose, proper installation thereof may present a problem in determining that the fastener is adequately tightened while at the same time avoiding failure by exceeding the maximum strip-out torque of the anchor. In the devices of the prior art, the torque required to tighten the fastener to its optimum degree of holding power was so close to the torque resulting in strip-out of the assembly, that in many instances the assembly was over-tightened, resulting in failure.

SUMMARY OF THE INVENTION

The present invention is an improved concrete anchor consisting of an expansion nut in the form of a cylindrical coil of a resilient material and a bolt provided with a thread adapted to receive the coil. The thread of the bolt has two sections of different effective minor diameters. A first section immediately adjacent the threaded end of the bolt has a minor diameter sufficiently small to permit the bolt to enter the coil without causing any distortion or enlargement in the outer diameter of the coil. Adjacent the first threaded section and extending toward the head of the bolt is a second section having a larger minor diameter which causes expansion of the coil on engagement therewith. The end of the coil facing away from the head of the bolt is provided with a short, straight tab portion which extends in a direction generally away from the head of the bolt while tapering inwardly toward the axis thereof. The opposite end of the coil is provided with locking means for engaging the wall of the hole in which the anchor assembly is used in order to inhibit rotation of the coil.

In a preferred embodiment, the locking means comprises a second short, straight tab portion extending generally toward the head of the bolt and tapering outwardly away from the axis thereof. Between the end of the second threaded section and the head of the bolt is an unthreaded shank portion having a diameter greater than the effective minor diameter of the second section, which further increases the diameter of the coil on engagement therewith, thus further guarding against strip-out failure during installation.

In use, adequate tightening of the anchor assembly is indicated by a rise in tightening torque resulting from full engagement of the first tab portion with the threads of the bolt. If tightening is continued beyond this point, engagement of the coil with the unthreaded shank portion of the bolt further increases the wedging action between the bolt and the coil, preventing strip-out failure and increasing the holding power of the assembly.

DESCRIPTION OF THE DRAWINGS

The invention will be better understood from the following detailed description thereof, taken in conjunction with the accompanying drawings, in which:

FIG. 1 is an isometric view of a typical assembly of the invention showing the expansion nut in position on the end of the bolt in condition to be inserted into a hole in concrete or similar material;

FIG. 2 is a top plan view of the bolt used in FIG. 1;

FIG. 3 is an enlarged view of the free (non-headed) end of the bolt, showing in cross-section and in phantom outline the positions assumed by the coil at various stages in the tightening procedure;

FIG. 4 is a side view of the expansion nut of FIG. 1;

FIG. 5 is a view from the left side of FIG. 4;

FIG. 6 is a view from the right side of FIG. 4;

DETAILED DESCRIPTION

Figure 7:
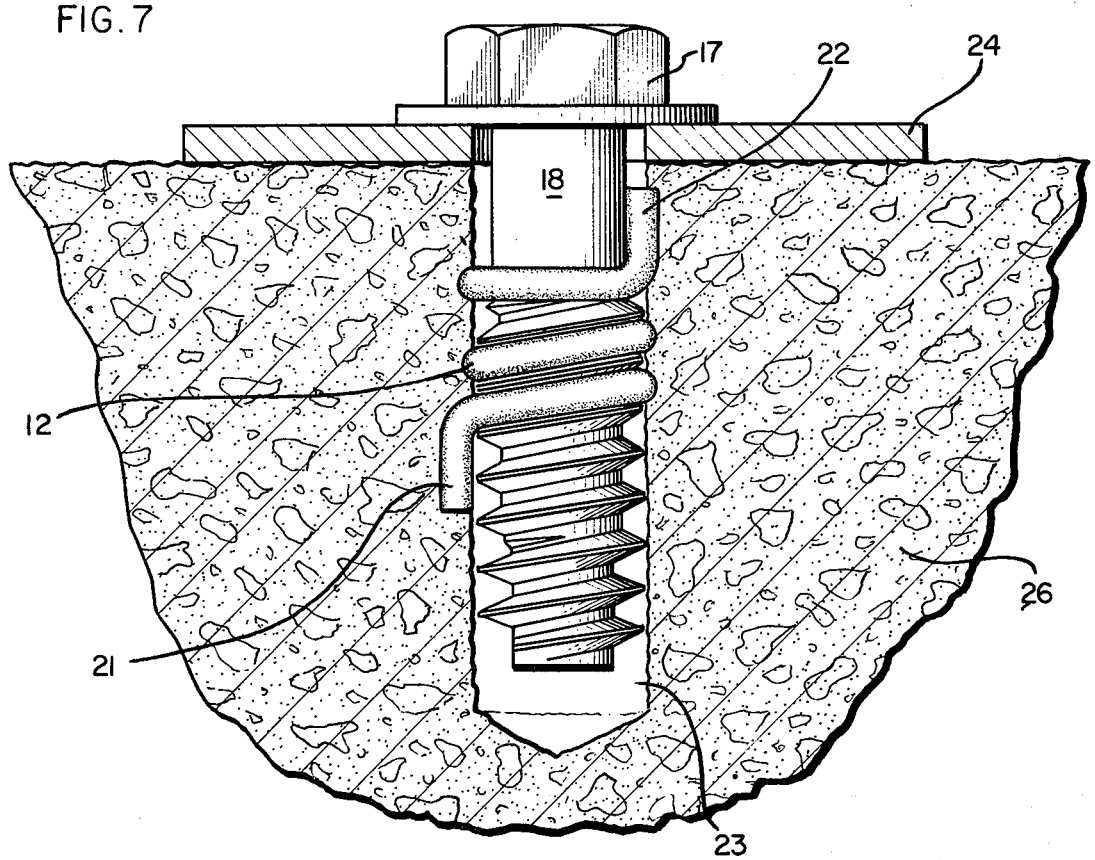
FIG. 7 is a view showing the anchor of the invention in fully tightened condition, holding a work piece to the surface of a body of concrete.

As shown in FIG. 1, the anchor assembly 10 of the invention comprises two elements, i.e., an expansion spring nut 11 including a cylindrical helical coil 12 having a plurality of turns suitably formed of wire having a circular cross-section, the coil having substantially uniform inner and outer diameters, and a constant pitch. Associated with expansion nut 11 is a bolt 13 having a threaded portion 14 adjacent one of its ends 16, a head 17 or other driving means for rotating the bolt at the other of its ends, and an unthreaded shank section 18 separating threaded portion 14 and head 17. The thread 19 of bolt 13 is continuous and has a pitch and a direction of rotation, i.e., right-hand or left-hand, corresponding to those of coil 12. Although the major diameter of thread 19 is substantially uniform, the effective minor diameter thereof is not. Rather, in section A (FIG. 2) adjacent end 16 of the bolt, the effective minor diameter is smaller than that of section B, there being a smooth but abrupt transition between the two sections.

As used herein, the term "effective minor diameter" refers to the inner diameter of the diametrically smallest cylindrical coil of constant wire cross-section which can be caused to engage thread 19 without enlarging the diameter of the coil. The "effective minor diameter" may or may not be equal to the root diameter of the thread, depending on whether the coil rides on the root of the thread or on the flanks of two adjacent threads.

The increase in effective minor diameter between section A and section B of thread 19 can be achieved in any suitable manner, provided only that the outer diameter of the coil is increased as the turns thereof pass from section A to section B on rotation of the bolt relative to the coil. For example, bolt 13 may be provided with a continuous groove of any configuration (e.g., semicircular or rectangular) appropriate for receiving the coil, the effective depth of the groove being greater in section A than in section B, whereby the coil is expanded in passing from section A to section B. Further, although the wire used in forming coil 12 is shown as having a circular cross-section, it is not so restricted. Other wire forms, including square, rectangular or triangular can also be used, in conjunction with a groove having an appropriate shape for receiving the coil.

A preferred form of groove is illustrated in FIGS. 2 and 3. As shown, thread 19 has a triangular cross-section and a constant major diameter $d_1$. In section B, however, the flanks of the thread form a relatively large, e.g., 60°, angle at the apex, while in section A the flanks of each thread form a smaller, e.g., 45°, angle. The more nearly vertical flanks of two adjacent threads in section A provide greater clearance for the turns of coil 12 in nut 11. In section B, however, the inclined opposite flanks provide less clearance for the coil and cause it to expand, so that the effective minor diameter ($d_2$) of section B is greater than that ($d_3$) of section A. The expansion of coil 12 in section B can also be achieved by increasing the actual minor diameter of the threads at this point and permitting the coil to contact the root of the thread. It is preferred, however, to cause expansion of the coil by contact with the flanks of the threads, thereby decreasing friction between the coil and the bolt during installation of the assembly.

Spring nut 11 is illustrated in detail in FIGS. 4, 5, and 6. As shown, first tab portion 21, integrally formed on one end of coil 12, comprises a straight section lying generally in a plane including the longitudinal axis of coil 12, the free end of the tab being inclined toward the axis at an angle $\alpha$ of about 10° to 30°. The length of the straight portion of tab 21 is not critical and is suitably about 0.3 to 1.5 times the inner diameter of the coil. The second tab portion 22, integrally formed on the other end of coil 12, also lies generally in a plane including the longitudinal axis of the coil, but not necessarily in the same plane as that in which first tab portion 21 lies. As shown, the free end of second tab portion 22 is inclined outwardly away from the longitudinal axis of the coil at an angle $\beta$ of about 1°–20°. The length of the straight section of second tab portion 22 is also not critical and is suitably about 0.3 to 1.5 times the inner diameter of the coil. The principal function of second tab portion 22 is to lock the coil against rotation in the hole during the tightening of the anchor assembly. Although this function can also be achieved by a straight section which is tangent to the end of the coil, i.e., not inclined toward head 17 of bolt 13, it has been found that positioning the second tab portion with its free end pointing towards the head of the assembly increases not only the resistance to stripout failure during tightening of the assembly, but also the resistance to pull-out of the installed anchor.

For installation of the assembly, spring nut 11 is screwed onto section A of bolt 13 until resistance is felt when the end of the coil reaches the juncture between sections A and B. Because the effective minor diameter of section A is substantially equal to the inner diameter of the coil, little or no torque is required to assemble the components. The anchor assembly 10 is then inserted into a hole of suitable size in concrete, cement or other material in which the installation is to be made, the hole having a diameter slightly larger than the outer diameter of coil 12, thus permitting the assembly to enter the hole freely to a depth at which the outer extremity of second tab 22 contacts the side of the hole. The assembly is now tapped lightly with a hammer until the head 17 of the assembly contacts a workpiece, e.g., 24 (FIG. 7), to be attached to the concrete. Tapping is required to overcome the resistance offered by tab 22, which acts as an anchor to prevent rotation of the coil as the bolt is turned. Head 17 is then turned to complete the tightening until a rise in required torque is felt, if manual tightening is used, or until a power-driven driver reaches a pre-set torque value.

FIG. 7 shows a typical installation of the anchor assembly of the invention in a fully tightened condition. As shown, coil 12 has engaged the threads of section B of bolt 13 and is firmly expanded into contact with the wall of hole 23 in concrete section 26. First tab portion 21 has been fully expanded into contact with the wall of the hole, while the upper turn of coil 12 has been engaged by the unthreaded shank section 18 of the bolt. Second tab portion 22 has also been forced into locking contact with the wall of the hole by shank section 18.

Figure 8:
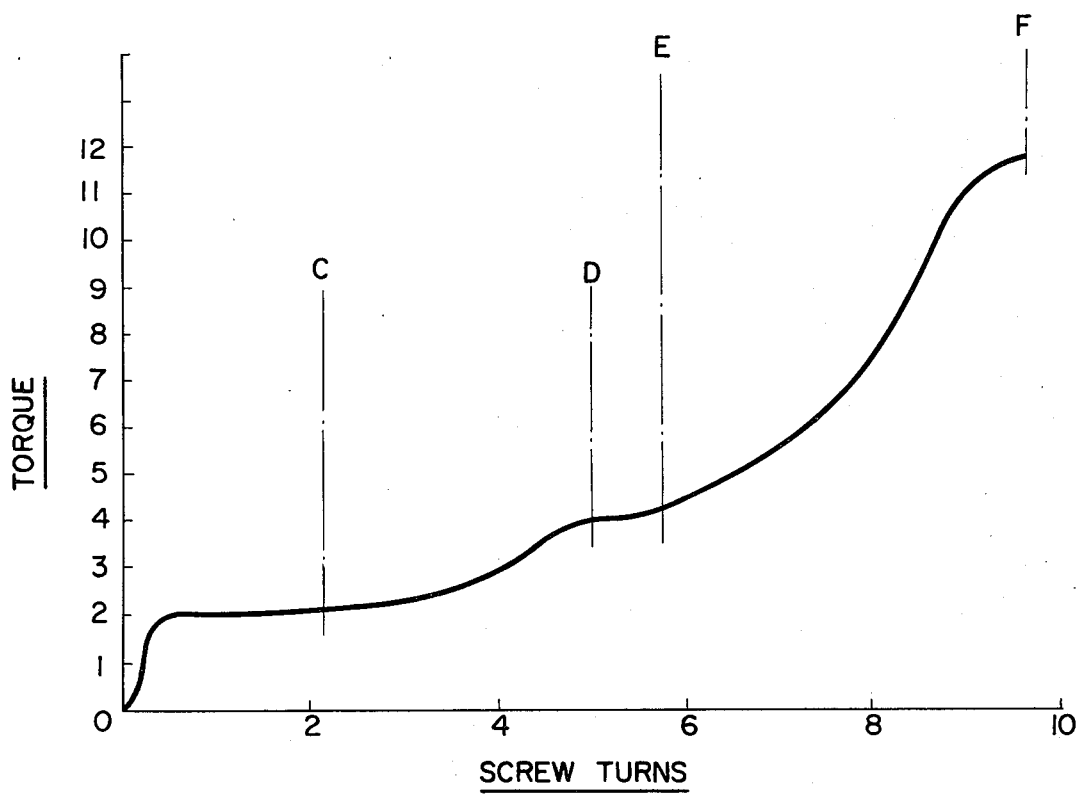
FIG. 8 is a graph showing the torque required to tighten a typical anchor of the invention as a function of the number of turns of the bolt.

The torque required at various stages of the tightening procedure is shown in the graph of FIG. 8. As shown, an essentially constant torque is required to screw the bolt into the spring nut, until at point C, the end 16 of the bolt contacts first tab 21, causing an increase in the torque required for turning the bolt. Increasing torque is required to turn the bolt as first tab 21 is bent outwardly by the end of the bolt and begins to ride over the tops of thread 19. At point D, tab 21, is fully engaged with the threads of the bolt and no increase in torque is required to turn the bolt. The increase in torque encountered in reaching point D would indicate to a skilled worker using a manual wrench that sufficient tightening has been achieved.

If tightening is continued beyond point D, the upper turn of coil 12 reaches unthreaded shank section 18 of the bolt and begins to ride up onto this section, causing a rapid increase in torque which indicates an over-tightened condition ultimately ending in breakage of the bolt at point F. It has been found that tightening the anchor to any point in the range C–D of FIG. 8 provides adequate holding power for most purposes, the point D representing, in a typical installation, a resistance to pull-out equal to the breaking strength of a soft bolt of minimum strength and half the force required to break a hardened bolt.

Although the principal function of a second tab portion 22 is to anchor the coil in the hole while the bolt is being tightened, the particular configuration thereof, i.e., extending toward the head of the bolt rather than radially outward, not only increases the resistance to stripout failure during installation, but also contributes substantially to the pull-out resistance of the assembled anchor. Tests in concrete have shown that resistance to pull-out can be increased by over 100% by angling second tab portion 22 toward the head of the bolt, as used in the anchor of the invention.

It will be seen that the invention provides an anchor for use in concrete and the like which is simple in construction, requires no special tools for installation, and which need not be bottomed in the hole. The anchor is practical for shallow depths, but is not restricted thereto. The inherent resiliency of the spring nut not only accommodates irregularities in the shape of the hole in which the anchor is used, but also makes the anchor resistant to loosening under vibratory forces. Further, the design is completely flexible in all of its variables, i.e., thread diameter, thread pitch, spring wire size, and number of coils, all of which may be varied to suit any particular application.

The foregoing detailed description has been given for clearness of understanding only, and no unnecessary limitations should be understood therefrom as modifications will be obvious to those skilled in the art.

What is claimed is:

1. A concrete anchor comprising in combination:
an expansion nut consisting of a resilient cylindrical coil having substantially uniform inner and outer diameters throughout its length,
said coil having a first tab adjacent one of its ends which is inclined toward the axis of said coil in a direction generally parallel thereto, and a second straight tab adjacent the other of said ends, said second tab being inclined away from said axis in a direction away from said first tab portion;
a bolt having a first end provided with driving means for rotation, and a continuous helical groove adjacent a second end, said groove having a pitch and a direction of rotation corresponding to those of said coil;
said groove having a first section adjacent said second end in which the depth of the groove is sufficient to receive said coil without distortion of said coil and a second section of lesser depth adjacent said first section, whereby engagement of said coil with said second section causes the outer diameter of said coil to increase.

2. A concrete anchor in accordance with claim 2 in which said bolt includes an ungrooved shank intermediate said first end and said second section of said groove.

3. A concrete anchor comprising in combination:
an expansion nut consisting of a resilient cylindrical coil;
said coil having integrally formed first and second straight tab portions at its respective ends, each of said tab portions lying generally in a plane including the axis of said coil, said first tab portion being inclined toward said axis and said second tab portion being inclined away from said first portion and said axis at an angle of about 1°–20°;
a bolt having a first end provided with driving means for rotation and a threaded portion adapted to receive said coil adjacent the second of its ends;
the thread of said threaded portion being continuous and having a substantially uniform major diameter and a pitch corresponding to that of said expansion nut,
said thread having two sections of different effective minor diameters, a first section immediately adjacent said second end of said bolt having an effective minor diameter not larger than the inner diameter of said coil and a second section adjacent said first section having an effective minor diameter larger than the inner diameter of said coil, whereby engagement of said coil with said second section causes the outer diameter of said coil to increase.

4. A concrete anchor comprising in combination:
an expansion nut consisting of a resilient cylindrical coil;
said coil having integrally formed first and second straight tab portions at its respective ends, each of said tab portions lying generally in a plane including the axis of said coil, said first tab portion being inclined toward said axis and said second tab portion being inclined away from said first portion and said axis at an angle of about 1°–20°;
a bolt having a first end provided with driving means for rotation and a threaded portion adapted to receive said coil adjacent the second of its ends;
the thread of said threaded portion being continuous and having a substantially uniform major diameter and a pitch corresponding to that of said expansion nut,
said thread having two sections of different effective minor diameters, a first section immediately adjacent said second end of said bolt having an effective minor diameter not larger than the inner diameter of said coil and a second section adjacent said first section having an effective minor diameter larger than the inner diameter of said coil, whereby engagement of said coil with said second section causes the outer diameter of said coil to increase,
said thread having has a triangular cross-section, the apex angle of the thread in said first section being smaller than the apex angle of the thread in said second section, whereby the effective minor diameter of said first section of said groove is smaller than the effective minor diameter of said second section.

5. A concrete anchor in accordance with claim 4 in which said bolt includes an unthreaded shank intermediate said first end and said second section of said thread.

6. A concrete anchor in accordance with claim 5 wherein the apex angle of said first section is 45° and the apex angle of said second section is 60°.

7. A concrete anchor in accordance with claim 5 wherein said shank is generally cylindrical and has a diameter greater than the effective minor diameter of the thread in said second section.

8. An anchor in accordance with claim 4 wherein each of said tab portions has a length about 0.3 to 1.5 times the inner diameter of said coil.

9. An anchor in accordance with claim 8 wherein said first tab portion is inclined at an angle of about 10°–30° relative to the longitudinal axis of said coil.

10. An expansion nut suitable for use in conjunction with a threaded member to form a concrete anchor, said nut comprising a resilient cylindrical coil having integrally formed first and second straight tab portions at its respective ends, each of said tab portions lying generally in a plane including the axis of said coil, said first tab portion being inclined toward said axis and said second tab portion being inclined away from said first tab portion and said axis at an angle of about 1°–20°.

11. An expansion nut in accordance with claim 10 wherein each of said tab portions has a length about 0.3 to 1.5 times the inner diameter of said coil.

12. An expansion nut in accordance with claim 11 wherein said first tab portion is inclined at an angle of about 10°–30° relative to the longitudinal axis of said coil.

* * * * *

UNITED STATES PATENT AND TRADEMARK OFFICE
CERTIFICATE OF CORRECTION

PATENT NO. : 4,309,135
DATED : January 5, 1982
INVENTOR(S) : CHARLES E. GUTSHALL It is certified that error appears in the above-identified patent and that said Letters Patent are hereby corrected as shown below:

Col. 5, line 30 (Claim 2, line 1)

"2" should be --1--.

Signed and Sealed this

Twenty-first Day of September 1982

[SEAL]

Attest:

GERALD J. MOSSINGHOFF

Attesting Officer    Commissioner of Patents and Trademarks